United States Patent
Hallivuori

(10) Patent No.: US 8,369,446 B2
(45) Date of Patent: Feb. 5, 2013

(54) TRANSMITTER

(75) Inventor: Juha Hallivuori, Tampere (FI)

(73) Assignee: Nokia Corporation, Espoo (FI)

( * ) Notice: Subject to any disclaimer, the term of this patent is extended or adjusted under 35 U.S.C. 154(b) by 481 days.

(21) Appl. No.: 12/338,569

(22) Filed: Dec. 18, 2008

(65) Prior Publication Data

US 2009/0181626 A1 Jul. 16, 2009

(30) Foreign Application Priority Data

Dec. 20, 2007 (GB) .................................. 0724917.0

(51) Int. Cl.
*H04L 25/03* (2006.01)

(52) U.S. Cl. ..... 375/296; 375/295; 455/126; 455/127.1; 330/51; 330/52; 330/129; 330/151

(58) Field of Classification Search ..................... 445/91, 445/102, 108, 118–120, 113, 123, 125, 127.4, 445/126, 127.1, 115.1, 114.1, 63.1; 375/295, 375/296; 330/52, 129, 149, 151
See application file for complete search history.

(56) References Cited

U.S. PATENT DOCUMENTS

| 5,528,196 | A  | * | 6/1996  | Baskin et al. ................. 330/151 |
|-----------|-----|---|---------|------------------------|
| 6,275,106 | B1 | * | 8/2001  | Gomez ......................... 330/151 |
| 6,489,844 | B2 | * | 12/2002 | Yamashita et al. .............. 330/52 |
| 6,496,064 | B2 | * | 12/2002 | Rzyski .......................... 330/149 |
| 6,727,751 | B2 | * | 4/2004  | Yonenaga et al. ............. 330/151 |
| 6,792,251 | B2 | * | 9/2004  | Johannisson et al. ......... 455/126 |
| 6,958,647 | B2 | * | 10/2005 | Rabinovich et al. ............ 330/52 |
| 7,053,702 | B2 | * | 5/2006  | Blodgett ......................... 330/52 |
| 7,110,739 | B2 | * | 9/2006  | Braithwaite ............... 455/276.1 |
| 7,167,693 | B2 | * | 1/2007  | Bachman et al. ........... 455/127.1 |
| 7,173,484 | B2 | * | 2/2007  | Rabinovich et al. ............ 330/52 |
| 7,436,900 | B2 | * | 10/2008 | Hoffmann ..................... 375/296 |
| 7,791,413 | B2 | * | 9/2010  | Catoiu et al. ................. 330/151 |
| 2009/0054014 | A1 | * | 2/2009 | Seo et al. ....................... 455/101 |

\* cited by examiner

*Primary Examiner* — Linh Nguyen
(74) *Attorney, Agent, or Firm* — Locke Lord LLP

(57) ABSTRACT

An apparatus comprising a first circuit configured to receive a signal and output a first output signal, a second circuit configured to receive the same signal and output a second output signal with a phase delay compared to the first signal, and a combiner configured to combine said first and second output signals to provide a combined signal, wherein said phase delay is controlled such that an amplitude of said combined signal is controlled.

20 Claims, 2 Drawing Sheets

ID TRANSMITTER

FIELD OF THE INVENTION

The present invention relates to a transmitter and in particular but not exclusively to a transmitter for use in user equipment.

BACKGROUND

User equipment such as mobile telephones are known. These devices are arranged to be able to transmit signals and receive signals. There are several different standards which are being used worldwide at the present time. By way of example only, these standards include GSM (global system for mobile communication) 900, GSM 1800, WCDMA (wideband code division multiple access). One or more of these different systems may be used in the same country. Alternatively, different systems may be used in different countries. Additionally different standards may exist for different types of communication such as voice and data.

Multimode user equipment is known. These types of devices are capable of dealing with more than one of these standards. To deal with more than one of these standards, the transmitters of these phones have so far been designed in such a way such that they have a relatively high power consumption. Furthermore, the size of the transmitter is relatively large as is the cost of such a transmitter. This is a result of the requirement to deal with more than one standard or mode. The transmitter may need to be able to have a large operational bandwidth and/or linearity.

Reference is made to T. Sowlati, D. Rozenblit, R. Pullela, M. Damgaard, E. McCarthy, D. Koh, D. Ripley, F. Balteanu, I. Gheorghe, "Quad-band GSM/GPRS/EDGE polar loop transmitter" IEEE JOURNAL OF SOLID-STATE CIRCUITS, VOL. 39, NO. 12, DECEMBER 2004. This document describes the polar loop transmitter discussed in relation to FIG. 1 which is arranged to deal with a wide range of bandwidths. This is a polar loop transmitter. The known transmitter 2 comprises a first loop 4 for controlling the phase and a second loop 6 for controlling the amplitude of the transmitted signal.

An antenna 8 is provided. The transmitter 2 is connected to the antenna 8 via a switch 10. This switch allows the transmitter or a receiver (not shown) to be connected to the antenna. The phase loop 4 has an output which is connected to the input of a power amplifier 12. The power amplifier 12 has a control input Vcntrl 14 which is an output of the amplitude loop 6. The controls the amplification provided by the amplifier.

The phase loop 4 comprises an ultra high frequency UHF voltage controlled oscillator 20. The output of this oscillator 20 is connected to a first divider 22 which divides the frequency by M. The output of the first divider 22 is connected to a second divider 24 which divides the output of the first divider 24 by N. This provides an intermediate frequency reference IFref. The output of the second divider 24 is input to a phase frequency detector 26 the output of which is connected to a charge pump 28. The charge pump 28 has an output connected to a first low pass filter 30. The output of the first low pass filter 30 is connected to a radio frequency voltage controlled oscillator 32, the output of which is connected to a first amplifier 34.

The output of the first amplifier 34 represents the output of the phase loop 4 and is input to the power amplifier 12. It should be appreciated that the signal which is output by the first amplifier will have the required phase and will be at the required radio frequency.

The phase loop 4 also has an output 40 from between the first divider 22 and the second divider 24. The output 40 of the phase loop is input to a mixer 42 of the amplitude loop 6. Before being output of the phase loop, the output passes through a buffer 38.

The phase loop also has a first bandpass filter 44, the output of which is connected to a second amplifier 46. The input to the first bandpass filter 44 is a feedback path from the output of the power amplifier, via part of the amplitude loop as will be described in more detail hereinafter. The second amplifier 46 has an output connected to an IQ modulator 48. The IQ modulator has a base band I and Q input. The output of the IQ modulator is effectively at the intermediate frequency but is a modulated signal. The output of the IQ modulator 48 is input to a limiter 54, the output of which is connected to a second input of the phase frequency detector 26. The phase frequency detector will compare the phase of the modulated version of the intermediate frequency with the reference version of the intermediate frequency.

The output provided by the phase frequency detector 26 effectively has an output which instructs subsequent circuitry on how to adjust in order to lock onto the phase. The output of the phase frequency detector 26 is fed to the filter 30 which integrates the signal to smooth it. This smoothed signal is fed to the voltage-controlled oscillator. The VCO provides an output signal with a RF frequency that is proportional to the level of the input voltage, which is then fed back to the PFD 26.

The output of the IQ modulator 48 is additionally input to a second bandpass filter 50, the output of which is connected to an amplifier 52. The output of that amplifier 52 is input to a first detector 54 of the amplitude loop.

The amplitude loop 6 will now be described. A coupler 70 is provided between the power amplifier 12 and the switch 10. A small proportion of the output signal is input to a mixer 42. The mixer 42 mixes the output received from the coupler with the output 40 received from the phase loop 4 to provide an intermediate frequency signal. The output of the mixer 42 is input to an intermediate frequency voltage gain amplifier VGA 62. The output of this amplifier 62 is connected to a limiter 64, the output of which is connected to the first band pass filter 44 of the amplitude loop.

The output of the intermediate frequency voltage gain controlled amplifier 62 is also input to a second detector 60. The output of the first and second detectors 60 and 68 are input to a subtractor 70 which subtracts one value from the other to define an error value. The error value is input to a baseband VGA 72. The output of the baseband VGA 72 is input to a second low pass filter 74. The output of the second low pass filter 74 is input to a third amplifier 76, the output of which provides the voltage control signal 14 for the power amplifier 12. In other words the error signal will define the control signal applied to the power amplifier and hence the required amplitude of the output signal.

Effectively, the phase loop works by comparing an intermediate frequency reference signal generated by the UHF VCO and the first and second dividers with a modulated intermediate frequency signal. The modulated intermediate frequency signal is generated by the IQ modulator. The modulated signal is limited by the limiter 54 to keep the signal within required bounds. The phase frequency detector uses these inputs to provide an output with the required phase information. This signal is effectively processed and output at a radio frequency level to the power amplifier.

The amplitude loop 6 generates an error value from comparing a feedback signal with the modulated intermediate frequency signal. The feedback signal is taken by the coupler, passes through the mixer and VGA 62 to provide the feedback signal at the intermediate frequency. The signal with which it is compared is the modulated intermediate frequency signal, which has been filtered by the second band pass filter 50 and amplified by the amplifier 52. This is representative of the signal before it passes through the various components. This error signal is used to generate a control signal which is then used to control the power amplifier to control the amplitude of the transmitted signal. The output between the first and second dividers is input to the mixer 42 and is used to down convert the signal received from the coupler to an intermediate frequency.

Thus the arrangement of FIG. 1 uses two loops in controlling the transmitted signal, one for phase and one for amplitude. This arrangement produces a good transmitter, but the arrangement requires a large number of components including a power amplifier, gain controlled amplifiers (VGA), mixers, and a number of voltage controlled oscillators. This means that the transmitter has a relative large power consumption and transmitter size/cost. These components are provided to deal with the requirements of a multimode transmitter environment.

Reference is made to U.S. application Ser. No. 11/895,727 which discloses an antenna which has a PM branch output and a AM branch output which are combined in an antenna.

It is an aim of some embodiments of the invention to address the disadvantages discussed above.

SUMMARY OF THE INVENTION

According to one aspect of the present invention, there is provided a transmitter comprising a first circuit configured to receive a signal and output a first output signal; a second circuit configured to receive the same signal and output a second output signal with a phase delay compared to the first signal; and a combiner configured to combine said first and second output signals to provide a combined signal, wherein said phase delay is controlled such that an amplitude of said combined signal is controlled.

According to another aspect of the present invention, there is provided a transmitter comprising first circuit means for receiving a signal and for outputting a first output signal; second circuit means for receiving the same signal and for outputting a second output signal with a phase delay compared to the first signal; and combiner means for combining said first and second output signals to provide a combined signal, wherein said phase delay is controlled such that an amplitude of said combined signal is controlled.

According to a further aspect of the present invention, there is provided a method comprising providing first output signal; providing a second output signal being the same as said first output signal with a phase delay compared to the first signal; and combining the first and second output signals to provide a combined signal, wherein the method further comprises controlling said phase delay to control an amplitude of said combined signal.

BRIEF DESCRIPTION OF DRAWINGS

For a better understanding of the present invention and as to how the same may be carried into effect, reference will now be made by way of example to the accompanying figures in which.

DETAILED DESCRIPTION OF EMBODIMENTS OF THE PRESENT INVENTION

In general, embodiments of the present invention make use of two phase lock loops to generate the transmitter signal with frequency/phase modulation (FM/PM) and amplitude modulation (AM).

Figure 2:
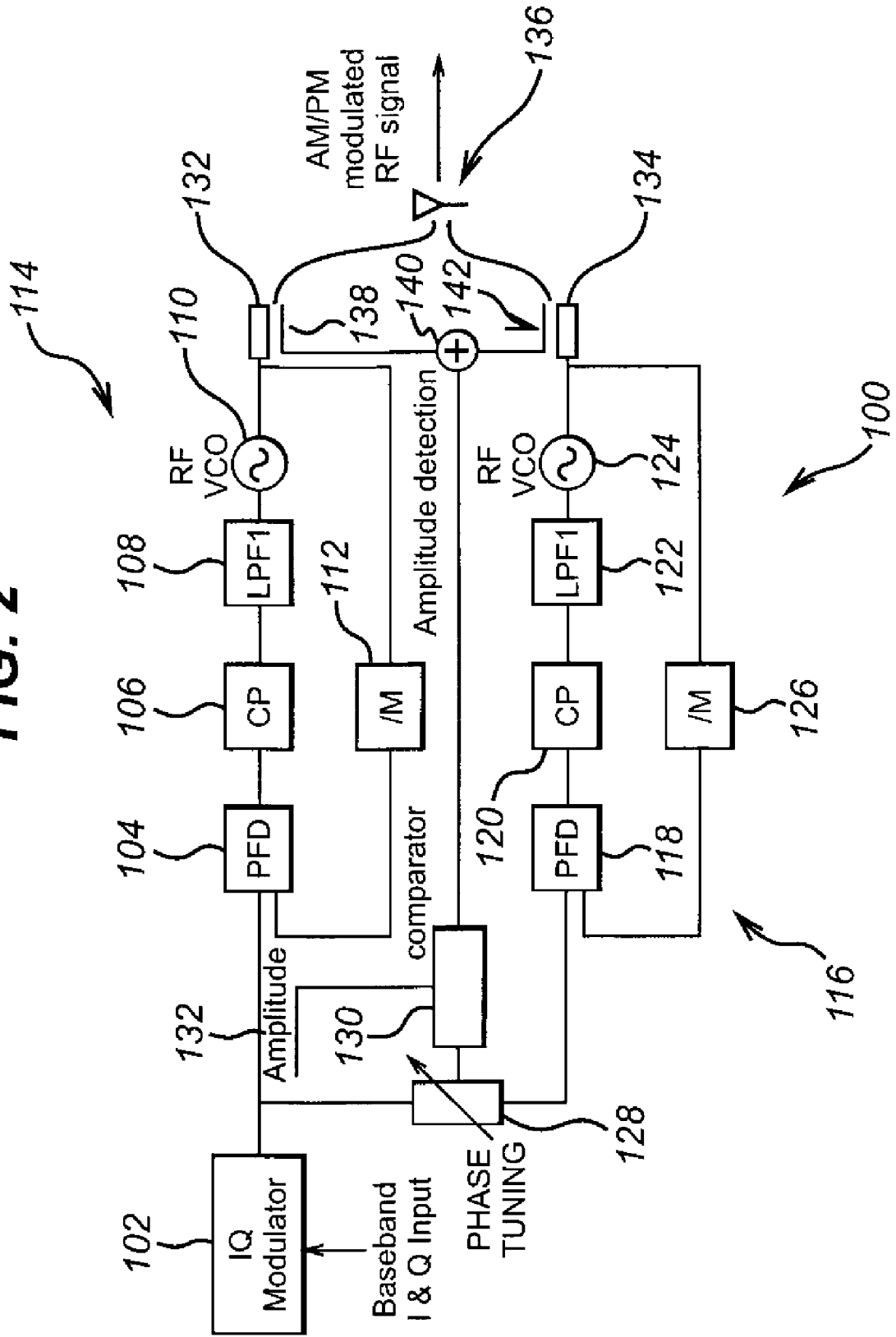
FIG. 2 shows a transmitter embodying the present invention.

The transmitter 100 of FIG. 2 has an IQ modulator 102. Baseband I (in phase) and Q (quadrature) signals are input to the IQ modulator 102. This IQ modulator 102 provides a modulated output at an intermediate frequency. The output of the IQ modulator is input to a first phase frequency detector 104. The output of the phase frequency detector 104 is input to a charge pump 106. The output of the charge pump 106 is input to a first low pass filter 108. The output of the low pass filter 108 is input to a radio frequency voltage controlled oscillator 110 which converts the intermediate frequency signal to the radio frequency signal. An output of the radio frequency voltage controlled oscillator 110 is input to a divider 112. The divider 112 divides by a factor of M. The output of the divider 112 is also input to the phase frequency detector 104. It should be appreciated that the phase frequency detector 104, the charge pump 106, the first low pass filter 108, the first radio frequency voltage controlled oscillator 110 and the first divider 112 comprise the first phase locked loop 114.

A second phase locked loop 116 comprises a second phase frequency detector 118 the output of which is connected to a second charge pump 120. The second charge pump 120 has its output connected to the second low pass filter 122. The output of the second low pass filter 122 is input to a second radio frequency voltage controlled oscillator 124. An output of the second radio frequency voltage controlled oscillator 124 is input to a second divide by M divider 126. The output of the second divider 126 provides an input to the second phase frequency detector 118.

The second phase frequency detector 118 is arranged to receive an input from the IQ modulator 102. However, the output of the IQ modulator 102 is arranged to pass through a phase tuning element 128 before being input to the second phase frequency detector 118. The phase tuning element 128 has an input from a comparator 130. The comparator 130 is arranged to compare a signal representing the amplitude of the output of the IQ modulator 102 on the one hand with an amplitude representative of the combined signal output by both the phase locked loops. The amplitude is not the full amplitude but instead an amplitude obtained from for example a coupler. Thus, a coupler is provided at the output of the IQ modulator. This coupler is shown schematically with reference 132.

The first phase locked loop 114 and the second phase locked loop 116 have the same radio frequency modulated signal at the output, the only difference being in the radio frequency phase produced by phase tuner 128. When these two signals which are the same, apart from their phase difference are fed to a non-galvanically connected parasitic antenna the summed signal will have an amplitude value defined by the intermediate frequency amplitude. This is ensured by combining these two RF signals in combiner 140 (in the same way as occurs in an antenna plate) and comparing that RF amplitude signal to the IF amplitude signal at comparator 130. If some difference is noticed, the phase tuner 128 will change the phase to track the changes in IF amplitude. This method can be used alternatively without the parasitic antenna structure.

A coupler 138 is arranged to provide a sample of the signal output by the output 132 of the first phase locked loop and input this to a summer 140. Likewise, a coupler 142 is arranged to provide a sample of the output of the output 134 of the second phase locked loop. This sample is likewise input to the summer 140 which sums the two samples. This combined amplitude signal is input to the comparator. The output of the comparator provides a signal which is used to control the phase tuning element 128. One simple phase tuner can be a resistor-varactor (a tunable capacitor) delay, which delay value can be tuned by a voltage. This tuning voltage can be a value defined by the difference in two compared inputs. If those compared amplitudes are equal, a constant voltage value will be fed to the phase tuner varactor control node.

As seen from FIG. 2, the transmitter embodying the present invention does not have a power amplifier of the required supporting circuits. This contrasts with the arrangement of FIG. 1 which has a power amplifier 12. This provides a low power transmitter structure without sacrificing the output power. This is due to a low loss impedance transformation and non-50Ω antenna structure.

In embodiments of the invention two PLLs are used to generate transmitter signals with frequency/phase modulation (FM/PM) and amplitude modulation (AM). The PM part is formed by a phased locked loop PLL which has I/Q modulated signal which is used by the PFD to create a VCO output signal frequency as a phase modulated RF frequency. Another PLL loop (which may be an exact replica of the first one) is fed with the same I/Q modulated signal but with RF frequency relative phase shift. Now when these two VCO output signals are fed to a common plate of the antenna 136, the phase difference determines the amplitude through the combined signals. Since if the same signals, but with a 180° phase difference, are combined the output will be zero in amplitude (in the ideal case) and if the phase difference is 0° the amplitude will be 2 times the fed signal amplitude. By varying the phase difference all the amplitude values between these two end values can be obtained.

In both of the loops, the phase frequency detector, compares the phase of two input signals. It has two inputs which correspond to two different input signals, one being a divided down signal from the voltage-controlled oscillator (VCO) and another from the IQ modulator. The output instructs subsequent circuitry on how to adjust to lock onto the phase. The output is fed to a filter which integrates the signal to smooth it. This smoothed signal is fed to a voltage-controlled oscillator. The VCO provides an output signal with a frequency that is proportional to the level of the input voltage, which is then fed back to the PFD as mentioned above.

The need for a power amplifier can avoided as there is no 50Ω connection between the VCO/PLL output and the antenna and the maximum combined voltage swing introduced by the VCOs at the antenna may be about 4 times the supply voltage. By way of example, if calculated traditionally a 1.2V VCO supply with some 10 dB antenna gain can produce ~25 dBm power transferred by the antenna. These values are possible since the electromagnetic connection between the antenna and the PLL can be used to transfer the impedance as required to achieve an optimum power transfer and the antenna itself is not required to have 50Ω interface. This fact may be used to create a small antenna structure with a much larger gain than in a traditional 50Ω antenna design. However one should notice that traditional 50Ω interface measurements may not be possible since there is no galvanic connection out of the transmitter. To confirm the power transmitted, antenna measurements over the air should be used.

The outputs of the respective loops are provided by the Voltage Controlled Oscillators. Thus an output stage of the transmitter is provided by combining together the output of first the Voltage Controlled Oscillator and the output of the second Voltage Controlled Oscillator. The combining element used in embodiments of the invention may be used to match the output impedance of the first Voltage Controlled Oscillator and output impedance of the second Voltage Controlled Oscillator to the impedance of antenna radiating element.

In the block level implementation shown in FIG. 2, the amplitude is defined by the phase difference between the oscillator signals, as the oscillators create the combined signal at the antenna. In alternative embodiments of the invention, a similar combination can be realized by summing the signals by other methods such as used in the amplitude detection circuit. The relation between the phase and the amplitude is not linear, but it is predictable and may be compensated with a non linear delay. In the embodiment shown in FIG. 2, where the amplitude is controlled by the loop, it is compensated.

The AM loop may be relatively very fast since the RF amplitude is compared to the instant amplitude of I/Q signal which may eliminate the PM/AM loop timing mismatch. This means that this structure can handle relatively wide bandwidths, that is larger than currently possible with today's common polar loop transmitters. By way of example only, embodiments of the invention may be used with bandwidths present in WCDMA systems and most likely also with future systems like UWB.

Figure 1:
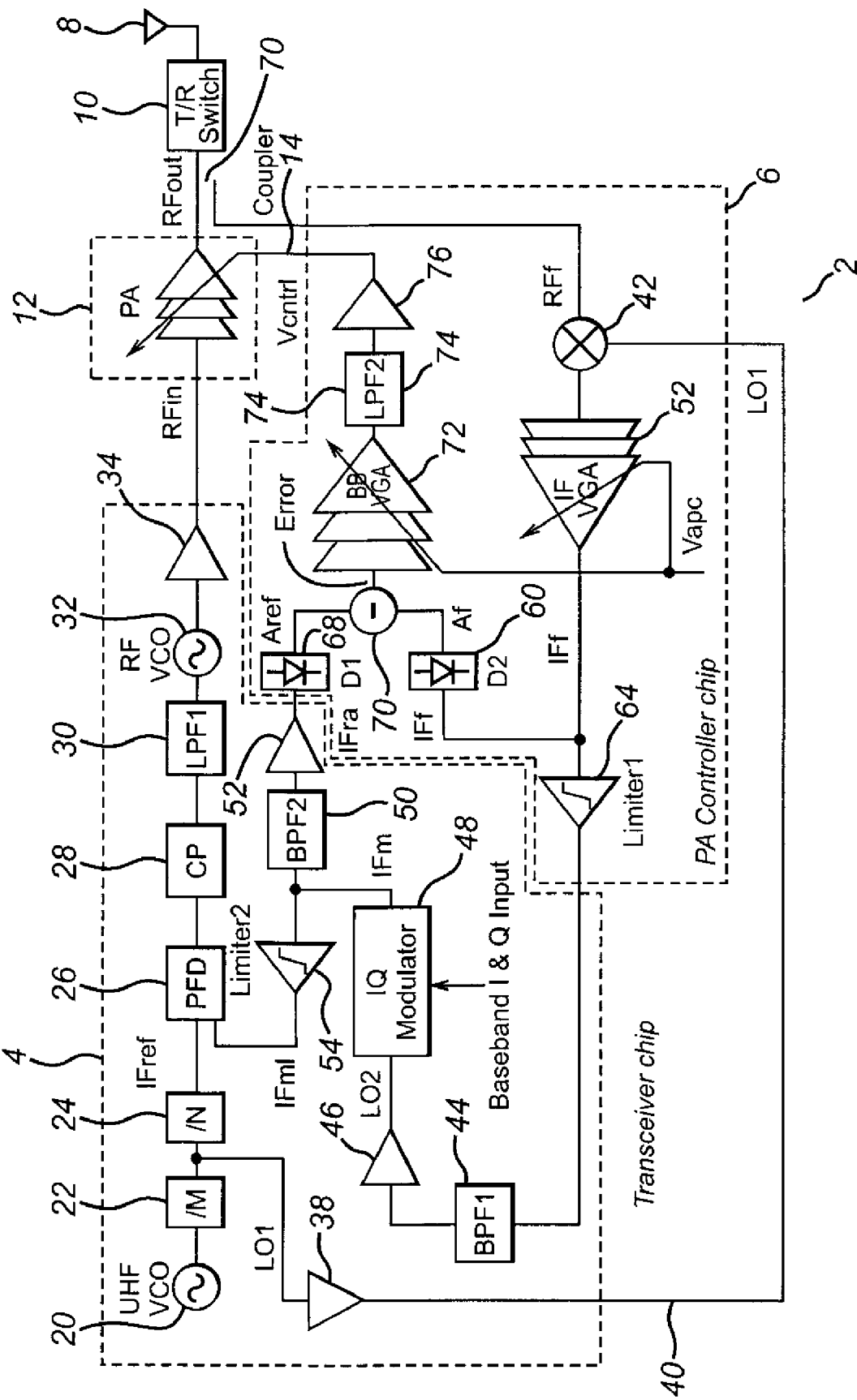
FIG. 1 shows a known transmitter.

Embodiments of the invention may handle more that one system as compared to a conventional polar loop architecture, and without the complications of the arrangement of FIG. 1. In some embodiments of invention, the phase delay might be introduced also to the first PLL loop. This may avoid problems in the accuracy of generating absolute phase delay values, in some embodiments of the invention. The control to the other phase delay may have an opposite/different effect to the delay compared to the case in the original delay component.

The power levels of the transmitter can be selected by the amplitude loop (by for example tuning of the comparator), or by the I/Q signal level and by changing the VCO supply voltage. The on-chip/parasitic antenna may exhibit no loss between the on-chip antenna and the parasitic antenna according to the measurements The arrangement of FIG. 2 has the advantage that there is no power amplifier and accordingly there is neither current consumption nor noise associated with a power amplifier. Additionally as there is no power amplifier, there is no pulling by a power amplifier on the VCO.

If the current consumption for the arrangement of FIG. 2 is compared to the transmitter ($I_{tot}$ 170 mA for GSM transmission) of FIG. 1, it may be possible to have the same power transmitted with 80% less current.

It should be appreciated that in some embodiments of the invention, the transmitter can be made on-chip with other components, using for example a conventional CMOS process.

As in some embodiments of the invention, there is a good PM/AM loop time match, this means that the same transmitter can be used for more than one standard and/or mode.

In embodiments of the invention, the spectral signal purity may be good, since there are no nonlinear components after the signal creation. Embodiments of the invention may not need a T/R switch at the output. Modern day multi-standard transmitter design has to cope with a limited number of antennas. Accordingly, fairly large switches are used to disconnect other transmitters (which introduces 50Ω load if connected) from the antenna while only one of the systems are in use. Embodiments of the invention may use only one transmitter to produce multiple system frequencies so in such embodiments, there may be no need for switches. Another issue is that there is no wired connection between the antenna and the transmitter so no switches are used in some embodiments of the invention.

In some embodiments of the invention, more than one transmitter maybe provided. However, in some embodiments of the invention, there is no loading present from the other transmitters due to the non-galvanic electromagnetic connection.

The transmitter PLL loop stability of embodiments of the invention, which have no power amplifier is good in comparison for example to the arrangement of FIG. 1.

An additional or alternative usage for the arrangement of FIG. 1 may be for I/Q combining. If one of the PLL is fed with an I signal and the other with a Q signal, it would be possible to control the I/Q signal 90° accuracy by inserting the amplitude control loop in half of the maximum transmitted signal amplitude mode.

In some embodiments it may be possible to improve the accuracy of the phase delay as well as its effects on I/Q signal if one PLL is fed with the opposite polarity delay to the other.

Embodiments of the invention may be used with any sort of transmitter. Some embodiments of the invention may be used in user equipment. The user equipment may take any suitable form and may for example be a telephone, mobile station, PDA (personal digital system), computer, laptop, multimedia device or any other suitable user equipment.

Embodiments of the present invention have been described in the context of a multimode phone, that is a phone which is able to transmit in accord with more than one mode or standard. However, embodiments of the present invention can be used with a device where there is a single mode.

Embodiments of the invention have been described as not requiring a power amplifier. However some embodiments of the invention may have a power amplifier with the arrangement of FIG. 2.

It should be appreciated at least some of the elements embodying the present invention may be provided on an integrated circuit or a set of integrated circuits (chip set).

It is also noted herein that whilst the above-described exemplifying embodiments of the present invention have been described, there is several variations or modifications which may be made to the disclosed arrangement without parting from the scope of the invention.

The invention claimed is:

1. Apparatus comprising:
a first circuit configured to receive a signal and output a first output signal;
a second circuit configured to receive the same signal and output a second output signal with a phase delay compared to the first signal; and
a combiner configured to combine said first and second output signals to provide a combined signal,
wherein said phase delay is controlled based partially on at least a difference between an amplitude associated with the combined signal and an amplitude associated with the signal for producing an amplitude modulation, and
wherein at least one of the first and second circuits comprises a phase locked loop.

2. Apparatus as claimed in claim 1, wherein said signal is a modulated signal.

3. Apparatus as claimed in claim 2, wherein said combiner is configured such that said combined signal comprises an amplitude modulated signal.

4. Apparatus as claimed in claim 1, wherein said first and second output signals comprise phase modulated signals.

5. Apparatus as claimed in claim 1, wherein said combiner comprises an antenna.

6. Apparatus as claimed in claim 5, wherein said antenna is placed and configured such that the first output signal and the second output signal is combined at the antenna.

7. Apparatus as claimed in claim 1, wherein the combined signal is made at an antenna.

8. Apparatus as claimed in claim 1, wherein the first output signal is an in-phase output, and the second output signal is a quadrature phase output.

9. Apparatus as claimed in claim 1, wherein said first and second outputs are connected to said combiner with no power amplifier there between.

10. Apparatus as claimed in claim 1, further comprising a comparator, said comparator being configured to compare an amplitude associated with the signal with an amplitude associated with the combined signal and on the basis of said comparison to generate a phase delay control signal.

11. Apparatus as claimed in claim 10, wherein an amplitude detection circuit is provided, said amplitude detection circuit configured to provide said amplitude associated with said combined signal.

12. Apparatus as claimed in claim 1, comprising a phase delay controller configured to control said phase delay.

13. Apparatus as claimed in claim 1, further comprising a third circuit configured to receive a baseband signal and output the modulated signal.

14. Apparatus as claimed in claim 13, wherein the third circuit comprises an in-phase-quadrature phase modulator.

15. Apparatus as claimed in claim 1, wherein said first circuit comprises an output stage provided by a first voltage controlled oscillator and said second circuit comprises an output stage provided by a second voltage controlled oscillator.

16. Apparatus as claimed in claim 15, wherein said combiner is configured to combine together an output of the first voltage controlled oscillator and an output of the second voltage controlled oscillator.

17. Apparatus as claimed in claim 15, wherein said combiner is configured such that said combiner matches an output impedance of the first voltage controlled oscillator and an output impedance of the second voltage controlled oscillator to an impedance of an antenna.

18. Apparatus comprising:
first circuit means for receiving a signal and for outputting a first output signal;
second circuit means for receiving the same signal and for outputting a second output signal with a phase delay compared to the first signal; and
combiner means for combining said first and second output signals to provide a combined signal, wherein said phase delay is controlled based partially on at least a difference between an amplitude associated with the combined signal and an amplitude associated with the signal for producing an amplitude modulation, and
wherein at least one of the first and second circuit means comprises a phase locked loop.

19. An integrated circuit comprising:
a first circuit configured to receive a signal and output a first output signal;

a second circuit configured to receive the same signal and output a second output signal with a phase delay compared to the first signal; and a combiner configured to combine said first and second output signals to provide a combined signal, wherein said phase delay is controlled based partially on at least a difference between an amplitude associated with the combined signal and an amplitude associated with the signal for producing an amplitude modulation, and wherein at least one of the first and second circuits comprises a phase locked loop.

20. A method comprising:

providing, via a first circuit, a first output signal from a received signal;

providing, via a second circuit, a second output signal, said second output signal being the same as said first output signal with a phase delay compared to the first signal; and combining the first and second output signals to provide a combined signal, wherein the method further comprises controlling said phase delay based partially on at least a difference between an amplitude associated with the combined signal and an amplitude associated with the signal for producing an amplitude modulation, and wherein at least one of the first and second circuits comprises a phase locked loop.

* * * * *